United States Patent
Kwon et al.

(10) Patent No.: US 10,698,262 B2
(45) Date of Patent: Jun. 30, 2020

(54) DISPLAY APPARATUS AND METHOD FOR CONTROL THEREOF

(71) Applicant: Samsung Electronics Co., Ltd., Suwon-si, Gyeonggi-do (KR)

(72) Inventors: Hyo-sun Kwon, Suwon-si (KR); Soo-hyun Um, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/221,967

(22) Filed: Dec. 17, 2018

(65) Prior Publication Data

US 2019/0196273 A1 Jun. 27, 2019

(30) Foreign Application Priority Data

Dec. 27, 2017 (KR) .................. 10-2017-0181318

(51) Int. Cl.
| | | |
|---|---|---|
| *G02F 1/133* | (2006.01) | |
| *G02F 1/13357* | (2006.01) | |
| *G09G 3/34* | (2006.01) | |
| *F21V 8/00* | (2006.01) | |

(52) U.S. Cl.
CPC ..... *G02F 1/133609* (2013.01); *G02B 6/0043* (2013.01); *G02B 6/0055* (2013.01); *G02B 6/0068* (2013.01); *G02F 1/133603* (2013.01); *G02F 1/133611* (2013.01); *G02F 1/133615* (2013.01); *G09G 3/3406* (2013.01)

(58) Field of Classification Search
CPC ......... G02F 1/133609; G02F 1/133603; G02F 1/133611; G02F 1/133615; G02B 6/0043; G02B 6/0055; G02B 6/0068
See application file for complete search history.

(56) References Cited

U.S. PATENT DOCUMENTS

| | | | |
|---|---|---|---|
| 10,274,661 B1 * | 4/2019 | Johnson | ............... G02B 6/0055 |
| 2005/0141217 A1 | 6/2005 | Kim | |
| 2013/0050615 A1 | 2/2013 | Rohrmoser | |
| 2013/0070170 A1 * | 3/2013 | Namekata | ......... G02F 1/133603 |
| | | | 348/836 |
| 2017/0148393 A1 * | 5/2017 | Peana | .................. G09G 3/3413 |

FOREIGN PATENT DOCUMENTS

| | | |
|---|---|---|
| KR | 10-1009665 | 1/2011 |
| KR | 10-2011-0021315 | 3/2011 |
| KR | 10-2011-0064742 | 6/2011 |

* cited by examiner

*Primary Examiner* — Anne M Hines
(74) *Attorney, Agent, or Firm* — Staas & Halsey LLP (57) ABSTRACT

A display apparatus includes a display panel, a light guide plate disposed under the display panel, a first reflective sheet disposed under the light guide plate, an edge type backlight including a plurality of light emitting diodes disposed on at least one side surface of the light guide plate, a top view type backlight including at least one light emitting diode disposed under the light guide plate at a position corresponding to a partial area of the display panel, and a processor configured to turn on one of the edge type backlight and the top view type backlight according to a display mode, wherein an area corresponding to the top view type backlight of the first reflective sheet is formed of a material having a greater refractive index than the light guide plate.

20 Claims, 9 Drawing Sheets

DISPLAY APPARATUS AND METHOD FOR CONTROL THEREOF

CROSS-REFERENCE TO RELATED APPLICATIONS

This application claims priority from Korean Patent Application No. 10-2017-0181318, filed on Dec. 27, 2017, in the Korean Intellectual Property Office, the disclosure of which is incorporated herein by reference in its entirety.

BACKGROUND

1. Field

Devices and methods consistent with what is disclosed herein relate to a display apparatus and a method for controlling thereof, and more particularly, to a display apparatus using a backlight unit and a controlling method thereof.

2. Description of the Related Art

With the development of display technology, various types of display apparatuses have been developed and popularized, and research and development have been actively conducted to optimize and minimize power consumption for a display apparatus.

A display apparatus includes a backlight, which is a light source, under a display panel, and displays an image by using light emitted from the backlight. Such a backlight is categorized by either an edge type or a top view type depending on an arrangement position.

Typically, an edge type backlight cannot display a content by controlling only a single block, but all blocks need to be turned on in a vertical unit or a horizontal unit, so that there is a disadvantage in that a large amount of power is consumed. A top view type backlight can display a content by controlling on a block basis, but is disadvantageous in that the cost is high and the structure of a display apparatus becomes complicated.

Accordingly, there is a need for developing a display apparatus to reduce power consumption by appropriately adopting the advantages of the edge type backlight and the top view type backlight.

SUMMARY

Additional aspects and/or advantages will be set forth in part in the description which follows and, in part, will be apparent from the description, or may be learned by practice of the disclosure.

An aspect of the exemplary embodiments relates to a display apparatus using an edge type backlight and a top view type backlight and a controlling method thereof.

According to an exemplary embodiment, there is provided a display apparatus including a display panel, a light guide plate disposed under the display panel, a first reflective sheet disposed under the light guide plate, an edge type backlight including a plurality of light emitting diodes disposed on at least one side surface of the light guide plate, a top view type backlight including at least one light emitting diode disposed under the light guide plate at a position corresponding to a partial area of the display panel, and a processor configured to turn on one of the edge type backlight and the top view type backlight according to a display mode, wherein an area corresponding to the top view type backlight of the first reflective sheet is formed of a material having a greater refractive index than the light guide plate.

Light incident on the first reflective sheet at an angle exceeding a predetermined angle range, of light emitted from the top view type backlight may be totally reflected by an area formed of the material, and light incident on the first reflective sheet within the predetermined angle range may be incident on the light guide plate by passing through the area formed of the material.

The display apparatus may further include a second reflective sheet disposed under the top view type backlight, and a prism sheet disposed on the second reflective sheet, wherein light totally reflected by the area formed of the material is scattered by the prism sheet and incident on the area formed of the material.

The processor may be further configured to turn on the edge type backlight in a first mode in which a content is displayed on an entire screen area, and turn on the top view type backlight in a second mode in which a content is displayed on a partial screen area.

The processor may be further configured to, based on an attribute of a content selected by a user, identify whether an area where the content is displayed is the entire screen area or the partial screen area, and based on the identified area, identify whether a mode is the first mode or the second mode.

The second mode may be at least one of an easy UI mode, a standby mode, and an ambient mode.

The processor may be further configured to display a content only on an area corresponding to the top view type backlight of the display panel in the second mode.

The top view type backlight may include a first top view type backlight disposed at a position corresponding to a first area of the display panel, and a second top view type backlight disposed at a position corresponding to a second area of the display panel, wherein the processor is further configured to turn on at least one of the first top view type backlight and the second top view type backlight based on at least one of a number and an attribute of contents provided in the second mode.

The processor may be further configured to move and display the content on a predetermined pixel basis in an area of the display panel corresponding to the top view type backlight.

A content displayed only on the partial screen area may include at least one of weather, clock, schedule, message, and call related information.

According to an exemplary embodiment, there is provided a method for controlling a display apparatus including a display panel, a light guide plate disposed under the display panel, and a first reflective sheet disposed under the light guide plate, the method including identifying a display mode of the display apparatus, and turning on one of an edge type backlight and a top view type backlight according to the display mode, wherein the edge type backlight comprises a plurality of diodes disposed on at least one side surface of the light guide plate, wherein the top view type backlight comprises at least one light emitting diode disposed under the light guide plate at a position corresponding to a partial area of the display panel, and wherein an area corresponding to the top view type backlight of the first reflective sheet is formed of a material having a greater refractive index than the light guide plate.

The method may further include a step in which, based on the top view type backlight being turned on, light incident on the first reflective sheet at an angle exceeding a predetermined angle range, of light emitted from the top view type backlight is totally reflected by an area formed of the material, and light incident on the first reflective sheet within the predetermined angle range is incident on the light guide plate by passing through the area formed of the material.

The display apparatus may further include a second reflective sheet disposed under the top view type backlight, and a prism sheet disposed on the second reflective sheet, wherein the step of light being incident on the light guide plate comprises a step in which light totally reflected by the area formed of the material is scattered by the prism sheet and incident on the area formed of the material.

The turning on may include turning on the edge type backlight in a first mode in which a content is displayed on an entire screen area, and turning on the top view type backlight in a second mode in which a content is displayed on a partial screen area.

The identifying may include based on an attribute of a content selected by a user, identifying whether an area where the content is displayed is the entire screen area or the partial screen area, and based on the identified area, identifying whether a mode is the first mode or the second mode.

The second mode may be at least one of an easy UI mode, a standby mode, and an ambient mode.

The method may further include displaying a content only on an area corresponding to the top view type backlight of the display panel in the second mode.

The top view type backlight may include a first top view type backlight disposed at a position corresponding to a first area of the display panel, and a second top view type backlight disposed at a position corresponding to a second area of the display panel, wherein the turning on comprises turning on at least one of the first top view type backlight and the second top view type backlight based on at least one of a number and an attribute of contents provided in the second mode.

The method may further include moving and displaying the content on a predetermined pixel basis in an area of the display panel corresponding to the top view type backlight in the second mode.

A content displayed only on the partial screen area may include at least one of weather, clock, schedule, and call related information.

According to the above-described various exemplary embodiments, a display apparatus displays a content by turning on an edge type backlight or a top view type backlight according to a display mode. Therefore, there is an effect of displaying a content with reduced power consumption.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

The terms used in this specification will be briefly described, and the present disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the present disclosure will be described in detail with reference to the accompanying drawings so that those skilled in the art can easily carry out the present disclosure. However, the present disclosure may be embodied in many different forms and is not limited to the embodiments described herein. In order to clearly illustrate the present disclosure in the drawings, some of the elements that are not essential to the complete understanding of the disclosure are omitted for clarity, and like reference numerals refer to like elements throughout the specification.

Figure 1:
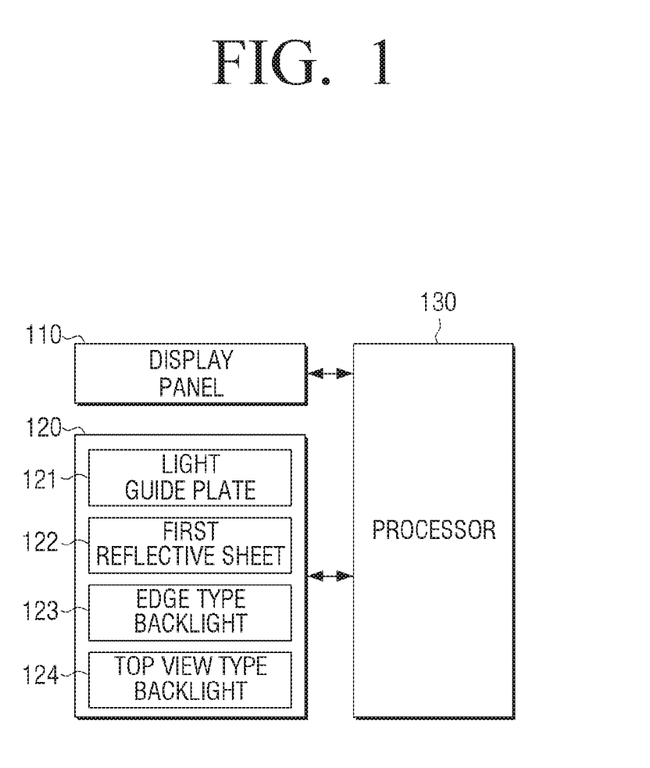
FIG. 1 is a block diagram illustrating a configuration of a display apparatus according to an embodiment of the present disclosure.

FIG. 1 is a block diagram illustrating a configuration of a display apparatus according to an embodiment of the present disclosure.

Referring to FIG. 1, a display apparatus 100 may include a display panel 110, a backlight unit 120 and a processor 130.

The display apparatus 100 according to an embodiment of the present disclosure may be embodied as various types of displays such as a liquid crystal display (LCD), an organic light emitting diode (OLED), liquid crystal on silicon (LCoS), or digital light processing (DLP), but the present disclosure is not limited thereto, and the display apparatus 100 may be embodied as various types of electronic apparatuses that could display a screen.

The display panel 110 may perform displaying by adjusting a transmittance of light emitted from the backlight unit 120 and visualizing an image signal. The display panel 110 may include first and second substrates (not shown) to face each other, in which an electrode is generated, and a liquid crystal material may be injected between the first and second substrates. When a voltage is applied to the two substrates, an electric field may be generated, so that molecules of the liquid crystal material injected between the two substrates may move. Accordingly, the optical properties of the display panel 110 may be changed.

For example, when a voltage is applied to the two substrates, and an electric field is generated, light may not pass through the display panel 110 due to the arrangement of liquid crystal molecules. However, when an electric filed is not generated, light may pass through the display panel 110. The display panel 110 may independently adjust a transmittance of light for each pixel, and control light transmission of each of a plurality of pixels included in the display panel 110 to display a screen corresponding to an image signal.

The display panel 110 may include sub-pixels of Red (R), Green (G) and Blue (B). The display panel 110 may control the generation of the electric field according to an image signal to thereby turn on or turn off each of the sub-pixels of R, G and B, and display a screen corresponding to an image signal.

The backlight unit 120 may provide light to the display panel 110 through at least one optical sheet (not shown). The backlight unit 120 according to an embodiment of the present disclosure may include a light guide plate 121, a first reflective sheet 122, an edge type backlight 123 and a top view type backlight 124.

The light guide plate 121 may be disposed under the display panel 110. The light guide plate 121 may guide light incident from the edge type backlight 123 or the top view type backlight 124 and emit the light toward the front. For example, the light guide plate 121 may, when the light emitted from the edge type backlight 123 is incident on the light guide plate 121, change a direction of the incident light, and uniformly transmit the light to the display panel 110.

A plurality of convex stripes may be formed on a front surface of the light guide plate 121 (a surface on which the display panel 110 is disposed) to change a direction of light, and a plurality of dots may be provided on a rear surface of the light guide plate 121.

The light guide plate 121 may be formed of poly methyl methacrylate (PMMA) or transparent polycarbonate (PC).

A first reflective sheet 122 may be disposed under the light guide plate 121. The first reflective sheet 122 may reflect light emitted to the rear surface of the light guide plate 121 toward the light guide plate 121, and the light reflected onto the first reflective sheet 122 may be incident on the light guide plate 121 and emitted to the front surface of the light guide plate 121.

The first reflective sheet 122 may be formed by coating base materials with a highly reflective material. For example, the first reflective sheet 122 may be formed by coating a synthetic resin such as polyethylene terephthalate (PET) with polymer having a high reflectivity.

The edge type backlight 123 and the top view type backlight 124 may include light sources, and emit light toward the light guide plate 121. The light source may be embodied as a device that emits monochromatic light (light of a specific wavelength, for example, blue light) or white light in various directions. For example, the light source may be embodied with LED (light emitting diode), or Cold Cathode Fluorescence Lamp (CCFL) that has a small heating value. Hereinafter, for convenience of explanation, it will be assumed that the light source is embodied with a light emitting diode, and the edge type backlight 123 and the top view type backlight 124 each emits light by using a light emitting diode.

The edge type backlight 123 according to an embodiment of the present disclosure may be disposed on at least one side surface of the light guide plate 121, and may emit light toward the light guide plate 121. The edge type backlight 123 may include a plurality of diodes. For example, a plurality of light emitting diodes may be disposed at equal intervals in the edge type backlight 123 so that light emitted from the plurality of diodes has a uniform luminance. However, the present disclosure is not limited thereto.

The edge type backlight 123 may be disposed only on one side surface of the light guide plate 121, or on a plurality of side surfaces of the light guide plate 121 as well. For example, a first edge type backlight and a second edge type backlight may be respectively disposed on left and right side surfaces of the light guide plate 121.

The light emitted from the edge type backlight 123 may be incident on the light guide plate 121, and the incident light may move in various directions according to an incidence angle. For example, the light incident toward the front of the light guide plate 121 may be reflected from the front surface of the light guide plate 121, and emitted toward the rear surface of the light guide plate 121, or refracted from the front surface of the light guide plate 121 and emitted in a direction where the display panel 110 is disposed. The light incident toward the rear of the light guide plate 121 may be reflected from the rear surface of the light guide plate 121, or scattered by the dots of the rear surface of the light guide plate 121 and emitted toward the front surface of the light guide plate 121.

The light emitted from the edge type backlight 123 may be emitted to a center of the light guide plate 121 by reflection of light generated from the front surface and the rear surface of the light guide plate 121. The light inside the light guide plate 121 may be emitted through the front surface of the life guide plate by scattering of light generated from the rear surface of the light guide plate 121 and refraction of light generated from the front surface of the light guide plate 121.

The top view type backlight 124 may be disposed under the first reflective sheet 122. The top view type backlight 124 may include at least one light emitting diode disposed at a position corresponding to a partial area of the display panel 110 under the first reflective sheet 122.

An area corresponding to the top view type backlight 124 of the first reflective sheet 122 may be formed of a material that passes light emitted from the top view type backlight 124, rather than a highly reflective material that reflects light. For example, an area corresponding to the top view type backlight 124 of the first reflective sheet 122 may be formed of a material having a greater refractive index than the light guide plate 121, which is transparent enough to pass the light. Therefore, the entire area of the first reflective sheet 122 may not be coated with a material having a high reflectivity, but only the area corresponding to the top view type backlight 124 is formed of a material through which light could pass. Hereinafter, for convenience of explanation, an area corresponding to the top view type backlight 124 of the first reflective sheet 122, that is, an area formed of a material having a greater refractive index than the light guide plate 121, will be referred to as a high refraction area.

According to an embodiment, light incident on the first reflective sheet 122 at an angle exceeding a predetermined angle of the light emitted from the top view type backlight 124 may be totally reflected from the high refraction area. The predetermined angle may refer to a critical angle. In addition, light incident on the first reflective sheet 122 within a predetermined angle of the light emitted from the top view type backlight 124 may be incident on the light guide plate 121 by passing through the high refraction area.

Some of light incident on the light guide plate 121 at an angle exceeding a critical angle, of light emitted from the top view type backlight 124 and emitted in various directions may be totally reflected to the area of the top view type backlight 124, and light incident on the light guide plate 121 within a critical angle may be incident on the light guide plate 121 by passing through the high refraction area. The light incident on the light guide plate 121 may be emitted to the front surface of a liquid panel.

The backlight unit 120 according to an embodiment of the present disclosure may include a second reflective sheet and a prism sheet. The second reflective sheet may be disposed under the top view type backlight 124 and reflect the light emitted from the top view type backlight 124 and the light totally reflected from the high refraction area.

The prism sheet may be arranged on the second reflective sheet. The light totally reflected from the high refraction area may be reflected from the second reflective sheet, or scattered by the prism sheet arranged on the second reflective sheet. The scattered light may be emitted toward the high refraction area, and some of the light incident on the light guide plate 121 within a critical angle of the scattered light may be incident on the light guide plate 121 by passing through the high refraction area.

The display apparatus 100 may include a plurality of top view type backlights 124. For example, the display apparatus 100 may include a first top view type backlight disposed at a position corresponding to a first area of the display panel 110 and a second top view type backlight disposed at a position corresponding to a second area of the display panel 110. The areas corresponding to the first and second top view type backlights on the first reflective sheet 122 may be formed of a material having a greater refractive index than the light guide plate 121. For example, an area corresponding to the first top view type backlight of the first reflective sheet 122 may be embodied as a first high refraction area, and an area corresponding to the second top view type backlight may be embodied as a second high refraction area. Accordingly, light emitted from the first top view type backlight may be incident on the light guide plate 121 through the first high refraction area, and emitted in a direction where the display panel 110 is disposed, and light emitted from the second top view type backlight may be incident on the light guide plate 121 through the second high refraction area, and emitted in a direction where the display panel 110 is arranged.

The processor 130 may control the overall operation of the display apparatus 100.

According to an embodiment, the processor 130 may include one or more of a central processing unit (CPU), an MCU (Micro Controller Unit), a micro processing unit (MPU), a controller, an application processor (AP), a communication processor (CP), or an ARM processor, or may be defined by the term. The processor 130 may be implemented as a system on chip (SoC) with a built-in processing algorithm, a large scale integration (LSI), or a field programmable gate array (FPGA).

The display apparatus 100 may include a panel driver (not shown) controlling the display panel 110, and a backlight driver (not shown) controlling the backlight unit 120, but for convenience of explanation, it is assumed that the processor 130 controls the display panel 110 and the backlight unit 120.

The processor 130 may turn on one of the edge type backlight 123 and the top view type backlight 124 according to a display mode.

For example, in a first mode in which a content is displayed on an entire area of a screen, the processor 130 may turn on the edge type backlight 123, and in a second mode in which a content is displayed on a partial area of the screen, the processor 130 may turn on a top view type backlight.

The first mode may be a mode for activating an entire area of the display panel 110, and displaying a content by using the entire area of the display panel 110. The second mode may be a mode for activating a partial area of the display panel 110, and displaying a content by using the partial area of the display panel 110.

The processor 130 may identify a display mode, and turn on at least one of the edge type backlight 123 and the top view type backlight 124 according to the identified mode. For example, when the display mode is identified as the first mode and the edge type backlight 123 is turned on, the light emitted from the edge type backlight 123 may be uniformly scattered through the light guide plate 21, and uniformly incident on the entire area of the display panel 110. Therefore, in the first mode, a content may be displayed by using the entire area of the display panel 110.

When the display mode is identified as the second mode and the top view type backlight 124 is turned on, the light emitted from the top view type backlight 124 may be incident on the light guide plate 121 through the high refraction area included in the first reflective sheet 122, and the incident light may be uniformly incident from the display panel 110 to the area corresponding to the top view type backlight 124 by the light guide plate 121.

When the top view type backlight 124 is turned on, the light emitted from the top view type backlight 124 may not be uniformly scattered onto the entire area of the display panel through the light guide plate 121, but may be uniformly scattered onto an area corresponding to the area where the top view type backlight 124 is disposed and incident on the display panel 110. The processor 130 may, in the second mode, display a content only on the area corresponding to the area where the top view type backlight 124 is disposed, but not the entire area of the display panel 110. The area corresponding to the area where the top view type backlight 124 is disposed of the display panel 110 may refer to an area on which the light emitted from the top view type backlight 124 is incident on the display panel 110 by the light guide plate 121 by passing through the high refraction area of the first reflective sheet 122.

The first mode may be referred to as a normal mode, a general viewing mode, etc. For convenience of explanation, a mode for displaying a content by using an entire screen area by activating the entire area of the display panel 110 will be referred to as the first mode.

The second mode may be at least one of a low power mode, an easy UI mode, a standby mode, and an ambient mode. For example, the processor 130 may display a content by using only the partial area rather than the entire area of the display panel 110 in the easy UI mode. The low power mode refers to a mode for displaying a content by using the partial screen area rather than the entire screen area of the display panel 110. The easy UI mode may be a mode for displaying a UI that provides a user with status information, and in this mode, a UI may be displayed on the partial screen area rather than the entire screen area. The standby mode and the ambient mode may refer to a mode in which applications, contents, etc. executed as background are driven without user's additional control in the display apparatus 100. The display apparatus 100 may display the status information on the applications, contents, etc. executed as the background in the standby mode and in the ambient mode using only the partial screen area rather than the entire screen area.

In the second mode of the display apparatus 100, that is, in at least one of the low power mode, the easy UI mode, the standby mode and the ambient mode, the processor 130 may not activate the entire area of the display panel 110 by turning on the edge type backlight 123, but may activate the partial area of the display panel 110 by turning on the top view type backlight 124 to display a content on the partial area. The content displayed on the partial area may include at least one of weather, clock, schedule, message, and call related information. However, the present disclosure is not limited thereto. The content may be a displayable content using only the partial area, but not the entire area, and a UI, a content, an alarm, etc. that could provide a user with status information through a relatively small area may be displayed on the partial area.

For another example, the processor 130 may identify a mode based on an attribute of the content selected by a user. It can be determined whether an area where the content is displayed is an entire screen area or a partial screen area according to the attribute of the content selected by the user, and it could be determined whether a mode is the first mode or the second mode. For example, when the area where the content is displayed is the entire screen area, the processor 130 may identify the first mode and turn on the edge type backlight 123. When the area where the content is displayed is the partial screen area, the processor 130 may identify the second mode and turn on the top view type backlight 124. Accordingly, in the second mode, a content may be displayed on an area corresponding to a position where the top view type backlight 124 is disposed of the display panel, that is, the partial area.

When the display apparatus 100 includes a plurality of top view type backlights 124, the processor 130 may turn on at least one of the first top view type backlight and the second top view type backlight based on at least one of the number of contents and the attributes of the contents. For example, the processor 130 may turn on both the first top view type backlight and the second top view type backlight, and display first and second contents on respective areas corresponding to the first and second top view type backlights of the display panel 110. With respect to the area outside the areas corresponding to the first and second top view type backlights of the display panel 110, even in an inactivated state, the processor 130 may display the first and second contents by activating only the partial area.

The processor 130 may display a content by moving on a predetermined pixel basis in the area of the display panel 110 corresponding to the top view type backlight 124. In the second mode, because the content may be displayed in the partial area corresponding to the top view type backlight 124 rather than the entire area of the display panel 110, a burn-in phenomenon may occur according to lifetime of a device disposed on the area corresponding to the top view type backlight 124. The processor 130 may not display a content displayed in the second mode fixedly, but rather move the content on a predetermined time basis or a predetermined pixel basis in the area corresponding to the top view type backlight 124 for displaying. A burn-in phenomenon may be prevented by using a plurality of devices disposed on an area corresponding to the top view type backlight 124 in an equal amount rather than using a specific element.

Figure 2:
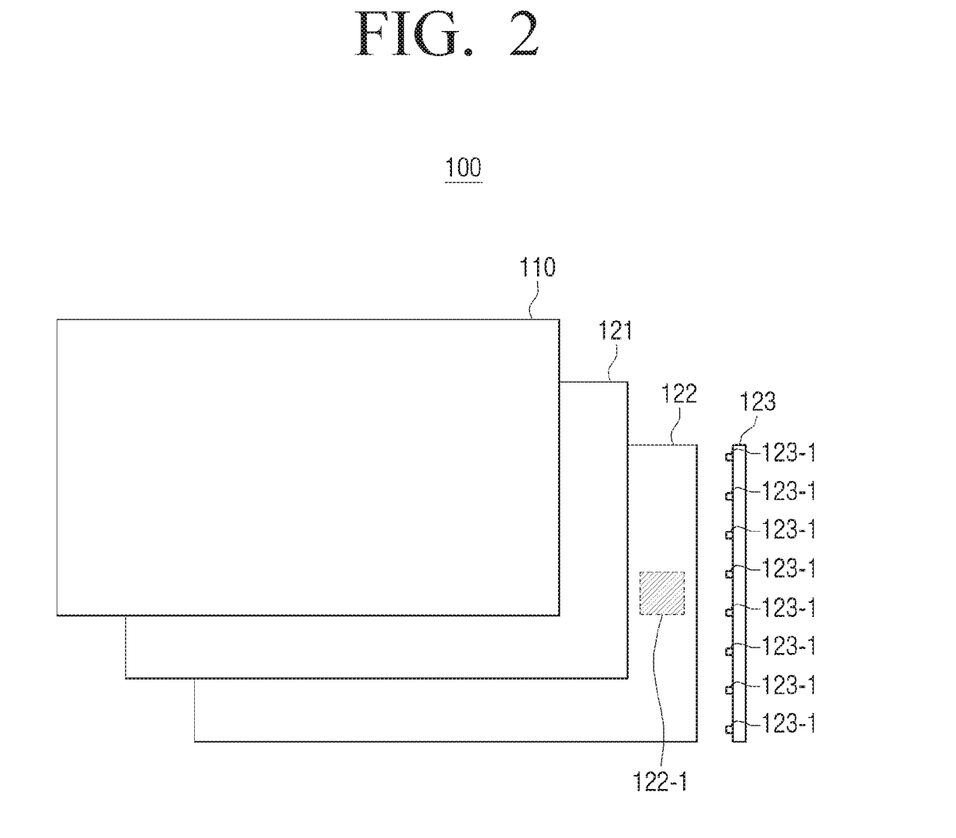
FIG. 2 is a schematic view illustrating an internal configuration of a display apparatus in three dimensions according to an embodiment of the present disclosure.

FIG. 2 is a schematic view illustrating internal configuration of a display apparatus in three dimensions according to an embodiment of the present disclosure.

Referring to FIG. 2, a backlight unit 120 may be provided and a display panel 110 may be stacked thereon to form a display apparatus 100.

A top view type backlight 124 may be disposed under the backlight unit 120, and a first reflective sheet 122 and a light guide plate 121 may be sequentially stacked on the backlight unit 120. An edge type backlight 123 may be disposed on both sides or one side of the light guide plate 121. The edge type backlight 123 may include a plurality of light emitting diodes 123-1 arranged at equal intervals therein. When the edge type backlight 123 is turned on, light emitted from the plurality of light emitting diode 123-1 may be uniformly scattered through the light guide plate 121, and incident on the display panel 110 through an optical sheet (not shown) arranged on the light guide plate 121.

Figure 3:
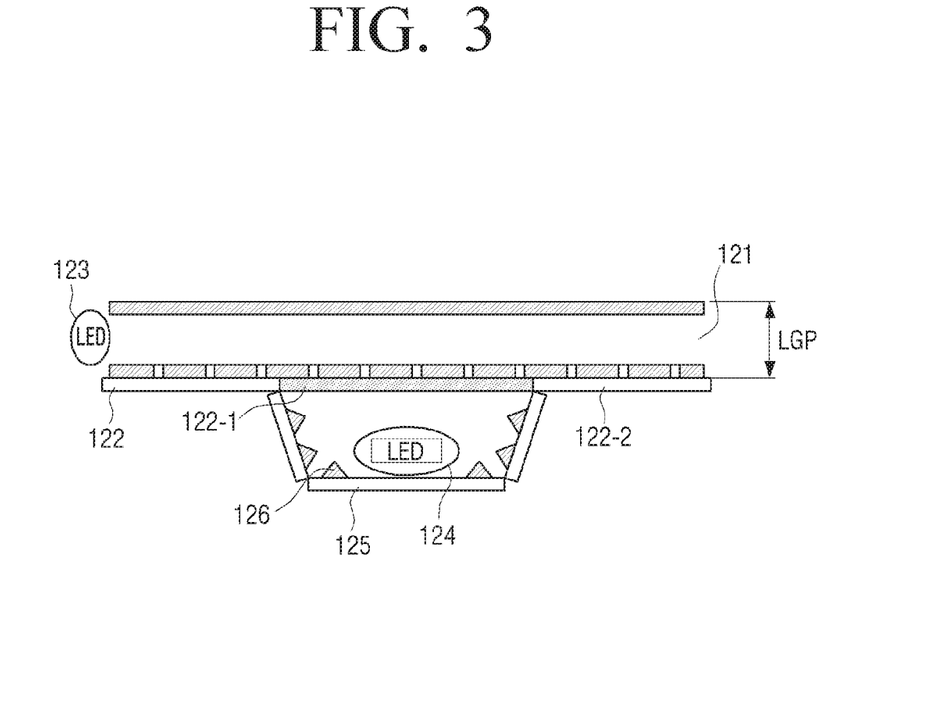
FIG. 3 is a cross-sectional view illustrating an internal configuration of a display apparatus according to an embodiment of the present disclosure.

FIG. 3 is a cross-sectional view illustrating internal configuration of a display apparatus according to an embodiment of the present disclosure.

Referring to FIG. 3, the first reflective sheet 122 may include a high refraction area 122-1 and an area 122-2 outside the high refraction area 122-1. The high refraction area 122-1 may be formed of a material having a greater refractive index than the light guide plate 121. A top view type backlight 124 may be disposed under the high refraction area 122-1. When the top view type backlight 124 is turned on, light emitted from a light emitting diode included in the top view type backlight 124 may be incident on the light guide plate 121 through the high refraction area 122-1, and incident on the display panel 110 through the light guide plate 121.

Figure 4:
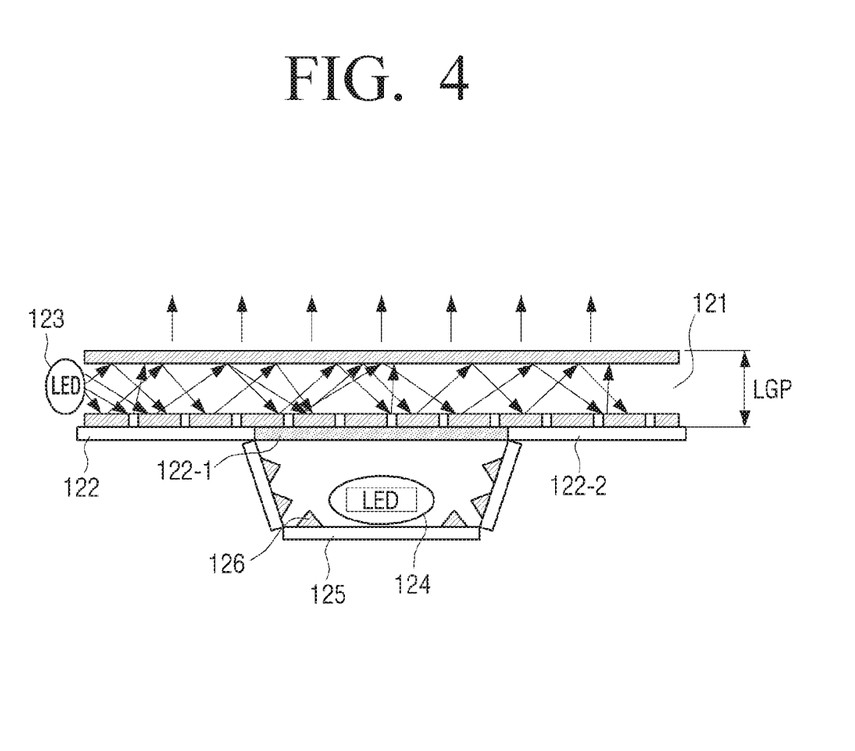
FIGS. 4 and 5 are views to explain a driving method for an edge type backlight according to an embodiment of the present disclosure.
Figure 5:
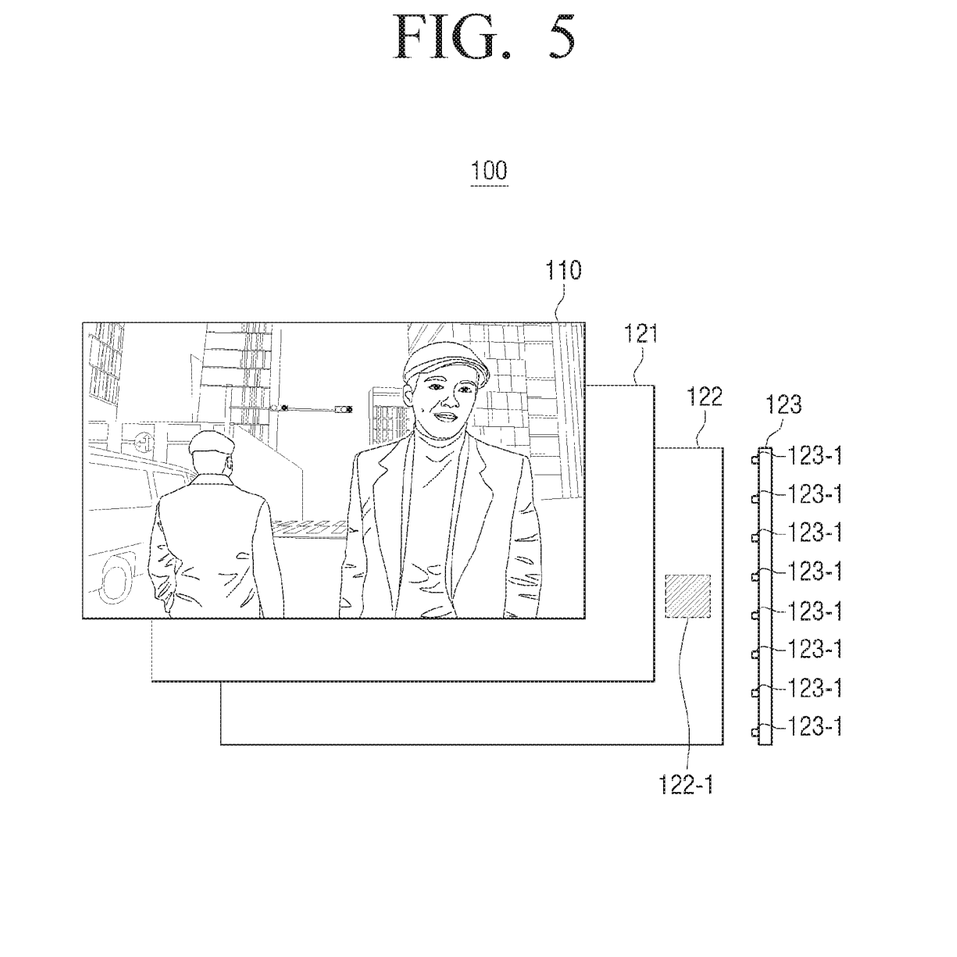

FIGS. 4 and 5 are views to explain a driving method for an edge type backlight according to an embodiment of the present disclosure.

Referring to FIG. 4, the light emitted from the edge type backlight 123 may be incident on the light guide plate 121, and the incident light may move in various directions depending on an incident angle.

According to an embodiment, when a display mode of the display apparatus 100 is a first mode, the edge type backlight 123 may be turned on. When the edge type backlight 123 is turned on, light may be uniformly incident on the display panel 110, and a content may be displayed on an entire area of a screen of the display panel 110.

The edge type backlight 123 may be turned on, and a part of the light emitted from a plurality of light emitting diodes 123-1 may be emitted toward the front surface of the light guide plate 121 and incident on the light guide plate 121, and the remaining light may be emitted toward the rear surface of the light guide plate 121 and incident on the light guide plate 121. A part of the light incident on the front surface of the light guide plate 121 may be reflected and emitted toward a center of the light guide plate 121, and the remaining light may be refracted from the front surface of the light guide plate 121 and emitted in a direction where the display panel 110 is disposed.

A part of the light incident toward the rear surface of the light guide plate 121 may be reflected and emitted to the center of the light guide plate 121, and the remaining may be scattered from the dots of the rear surface and emitted toward the front surface. The light emitted from the plurality of light emitting diodes 123-1 may be uniformly scattered on the light guide plate 121, and uniformly incident on the display panel 110. When the edge type backlight 123 is turned on, and the entire area of the display panel 110 is activated, the display apparatus 100 may display a content on the entire screen area.

Referring to FIG. 5, a display apparatus 100 may turn on the edge type backlight 123 in a first mode, for example, a general viewing mode, a normal mode, etc., and display a content by using the entire screen area.

Figure 6:
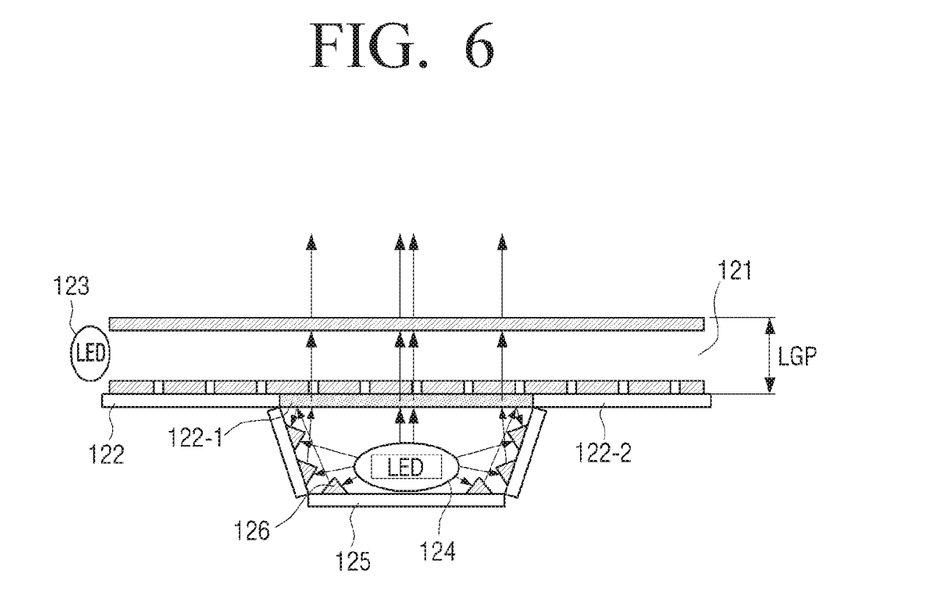
FIGS. 6 and 7 are views to explain a driving method for a top view type backlight according to an embodiment of the present disclosure.
Figure 7:
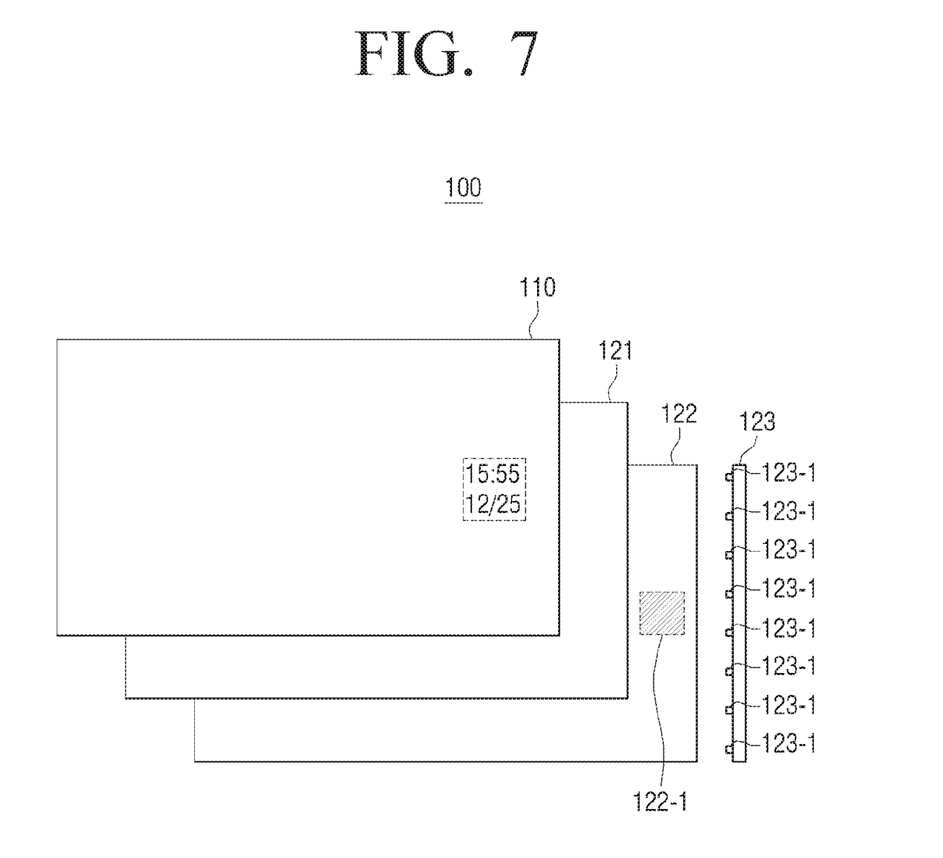

FIGS. 6 and 7 are views to explain a driving method for a top view type backlight according to an embodiment of the present disclosure.

Referring to FIG. 6, when a display mode of the display apparatus 100 is a second mode, the top view type backlight 124 may be turned on. When the top view type backlight 124 is turned on, light may be incident on a partial area of the display panel 110, and a content may be displayed on the partial screen area of the display panel 110.

Light emitted from a light emitting diode when the top view type backlight 124 is turned on may move in various directions. Light incident on the first reflective sheet 122 at an angle exceeding a predetermined angle may be totally reflected from a high refraction area 122-1 included in the first reflective sheet 122. A part of the totally reflected light may be reflected from a second reflective sheet 125, and emitted in a direction of the first reflective sheet 122, and the remaining light may be scattered on a prism sheet 126 and emitted in a direction of the first reflective sheet 122.

The light incident on the first reflective sheet 122 within a predetermined angle may be incident on the light guide plate 121 by passing through the high refraction area 122-1 included in the first reflective sheet 122. The light guide plate 121 may uniformly emit the incident light in a direction where the display panel 110 is disposed so as to remove unevenness of luminance. Light emitted in a direction where the display panel 110 is disposed may be incident on an area where the top view type backlight 124 or the high refraction area 122-1 is disposed in the display panel 110. Accordingly, the entire area of the display panel 110 may not be activated, but rather the partial area of the display panel 110 may be activated. The display apparatus 100 may display a content on the partial area of the activated screen when the top view type backlight 124 is turned on.

Referring to FIG. 7, a content may be displayed on an area corresponding to the high refraction area 122-1 of the display panel 110. The content may include at least one of time, weather, message, alarm, and location related information. Referring to FIG. 7, it is shown that time and date information (e.g., December, 25 at 3:55 pm) is displayed on a partial area, but the present disclosure is not limited thereto. The content displayed on the partial area could be various types of UIs for providing a user with simple status information by using a partial screen area, not an entire screen area.

When the display apparatus 100 displays a content only on the partial area corresponding to the high refraction area 122-1 in the screen in the second mode, the display apparatus 100 may move and display the content on a predetermined pixel basis or a predetermined time basis in the partial area. For example, as a clock object is continuously exposed on the partial area, lifetime of a device corresponding to the area may be relatively rapidly consumed than lifetime of the other devices. Accordingly, a burn-in phenomenon may occur on the partial area corresponding to the high refraction area 122-1 in the screen. In order to prevent the burn-in phenomenon, an object may be moved and displayed in the partial area at a predetermined time interval or a predetermined pixel interval. The object may refer to a content, a UI, etc. displayed on the partial area of the screen in the second mode.

Figure 8:
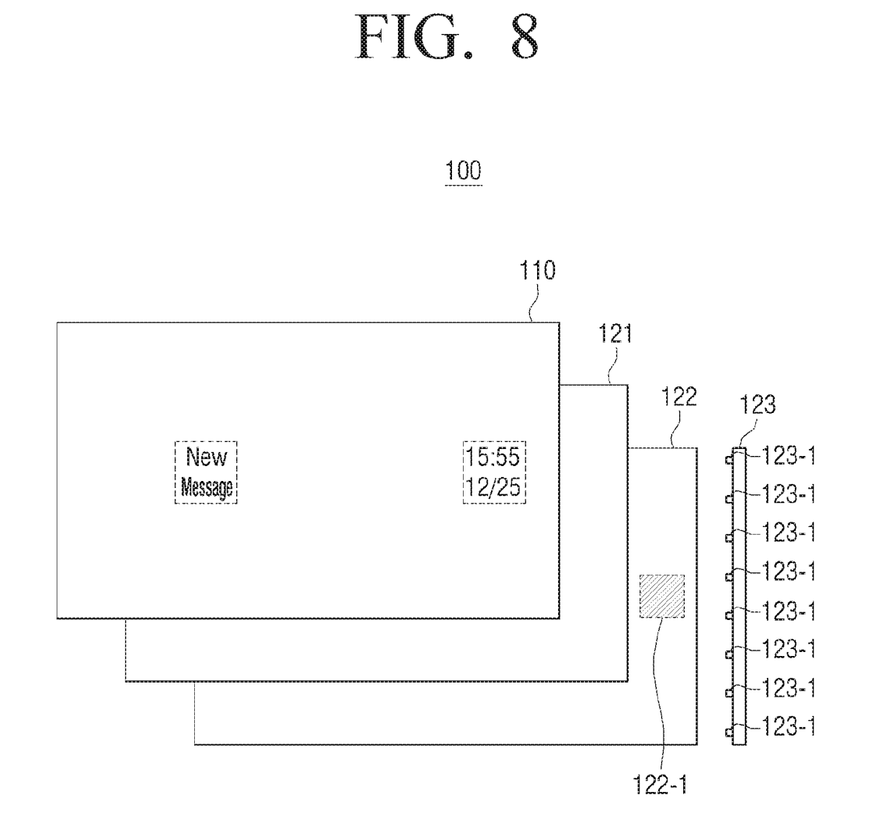
FIG. 8 is a view to explain a driving method for a top view type backlight according to an embodiment of the present disclosure.

FIG. 8 is a view to explain a driving method for a top view type backlight according to another embodiment of the present disclosure.

Referring to FIG. 8, a display apparatus 100 may include a plurality of top view type backlights. For example, a first top view type backlight may be disposed in a first area under the first reflective sheet 122, and a second top view type backlight may be disposed in a second area. The top view type backlight may be disposed to be spaced apart from the first reflective sheet 122 by a predetermined distance.

The position, area, size, etc. of where the first and second top view type backlights are disposed are not limited, but could vary depending on the purpose in the process of manufacturing the backlight unit 120.

The display apparatus 100 may turn on at least one of the first and second top view type backlights based on the number of the contents and the attributes of contents in the second mode. For example, the display apparatus 100 may display a UI indicating time and weather information in an area of the screen corresponding to the first top view type backlight in a standby mode. The display apparatus 100 may turn on the second top view type backlight for displaying a new alarm or a new messenger, and display a UI for providing information on the new alarm or the new messenger in an area of the screen corresponding to the second top view type backlight. However, the present disclosure is not limited thereto, and the display apparatus 100 may display a new alarm or a new message instead of the UI indicating the time and weather information in the area of the screen corresponding to the first top view type backlight.

The display apparatus 100 may include first and second top view type backlights having different areas. The display apparatus 100 may turn on one of the first and second top view type backlights based on the area required for displaying a content in the second mode, and display a content in an area of the screen corresponding to the turned-on top view type backlight. For example, the display apparatus 100 may turn on the first top view type backlight having a relatively large area based on a length of the received new message, and display the received new message in the area of the screen corresponding to the first top view type backlight. Because the edge type backlight 123 is turned off, a content may be displayed by activating a partial area although the entire area of the display panel 110 is not activated. Accordingly, power consumption may be reduced.

To prevent the burn-in phenomenon, the display apparatus 100 may display a content on a partial area corresponding to the first top view type backlight in the second mode, and display a content on a partial area corresponding to the second top view type backlight after a predetermined time passes. For example, the content displayed only on the partial area (e.g., clock UI, weather UI, etc.) may be displayed overlapped on a predetermined time basis in the area corresponding to the first top view type backlight and the area corresponding to the second top view type backlight.

Figure 9:
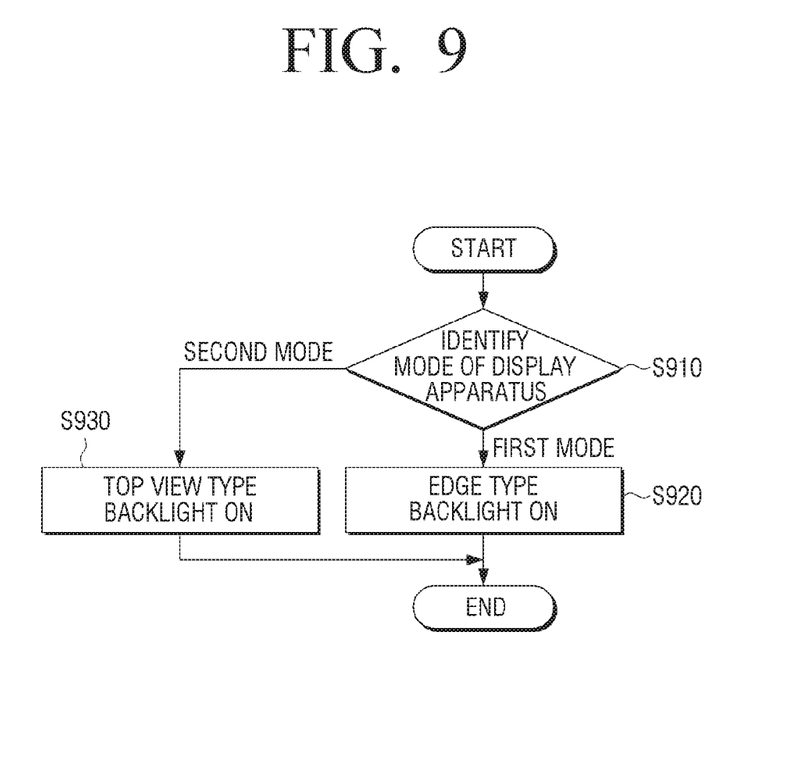
FIG. 9 is a flowchart to explain a controlling method for a display apparatus according to an embodiment of the present disclosure.

FIG. 9 is a flowchart to explain a controlling method for a display apparatus according to an embodiment of the present disclosure.

Referring to FIG. 9, a method for controlling a display apparatus including a display panel, a light guide plate disposed under the display panel, and a first reflective sheet disposed under the light guide plate may include identifying a display mode of the display apparatus at operation S910.

When a display mode is a first mode, an edge type backlight may be turned on at operation S920. When the display mode is a second mode, a top view type backlight may be turned on at operation S930.

The edge type backlight may include a plurality of diodes disposed on at least one side surface of a light guide plate, and the top view type backlight may include at least one light emitting diode disposed at a position corresponding to a partial area of the display panel under the light guide plate, and an area corresponding to the top view type backlight of the first reflective sheet may be formed of a material having a greater refractive index than the light guide plate.

According to an embodiment, when the top view type backlight is turned on, light incident on the first reflective sheet within a predetermined angel of the light emitted from the top view type backlight may be totally reflected by an area formed of the material, and light incident on the first reflective sheet at an angle exceeding a predetermined angle be incident on a light guide plate by passing through the area formed of the material.

A display apparatus may include a second reflective sheet disposed under the top view type backlight and a prism sheet disposed on the second reflective sheet, and at operation in which light is incident on a light guide plate, light totally reflected by the area formed of the material having a greater refractive index than the light guide plate on the first reflective sheet may be scattered by the prism sheet and incident on the area formed of the material.

Operations S920 and S930 of turning on an edge type backlight or a top view type backlight may include turning on an edge type backlight in a first mode where a content is displayed on an entire screen area, and turning on a top view type backlight in a second mode where a content is displayed only on a partial screen area.

An operation S910 of identifying a mode may include identifying whether an area where a content is displayed is an entire screen area or a partial screen area based on an attribute of a content selected by a user, and identifying whether a mode is a first mode or a second mode based on the identified area.

The second mode may include at least one of an easy UI mode, a standby mode and an ambient mode.

An operation of displaying a content only on an area corresponding to a top view type backlight of a display panel area in the second mode may be further included.

The top view type backlight may include a first top view type backlight disposed at a position corresponding to a first area of the display panel, and a second top view type backlight disposed at a position corresponding to a second area of the display panel, and an operation S930 of turning on the top view type backlight may include turning on at least one of the first and second top view type backlights based on at least one of the number of contents and the attributes of the contents provided in the second mode.

A controlling method according to an embodiment may include moving and displaying a content on a predetermined pixel basis in a display panel area corresponding to a top view type backlight in the second mode.

The content displayed only on the partial screen area may include at least one of weather, clock, schedule, message, and call related information.

The various embodiments described above may be implemented in a recording medium that can be read by a computer or a similar device using software, hardware, or a combination thereof. In some cases, embodiments described herein may be implemented by a processor itself. According to software implementation, embodiments such as the procedures and functions described herein may be implemented in separate software modules. Each of the software modules may perform one or more of the functions and operations described herein.

Meanwhile, computer instructions for performing the processing operations of the sound output apparatus 100 according to various embodiments of the present disclosure described above may be stored in a non-transitory computer-readable medium. The computer instructions stored in the non-volatile computer-readable medium cause a specific apparatus to perform the processing operations in the sound output apparatus 100 according to the various embodiments described above when executed by the processor of the specific apparatus.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. A display apparatus, comprising:
 a display panel;
 a first reflective sheet including a partial area having a first refractive index;
 a light guide plate disposed between the display panel and the first reflective sheet, and having a second refractive index less than the first refractive index;
 an edge type backlight including a plurality of light emitting diodes and disposed at an edge of the light guide plate;
 a top view type backlight including at least one light emitting diode and disposed at an opposite side of the first reflective sheet from the light guide plate at a position corresponding to the partial area of the first reflective sheet; and a processor configured to selectively turn on one of the edge type backlight and the top view type backlight according to a display mode.

2. The display apparatus as claimed in claim 1, wherein:
light emitted from the top view type backlight and incident on the partial area of the first reflective sheet at an angle exceeding a predetermined angle range is totally reflected by the partial area of the first reflective sheet, and
light emitted from the top view type backlight and incident on the partial area of the first reflective sheet at an angle within the predetermined angle range is transmitted to the light guide plate through the partial area of the first reflective sheet.

3. The display apparatus as claimed in claim 2, further comprising:
a second reflective sheet disposed at an opposite side of the at least one light emitting diode of the top view type backlight from the first reflective sheet; and
a prism sheet disposed on the second reflective sheet,
wherein light reflected by the partial area of the first reflective sheet is scattered by the prism sheet and reflected back toward the partial area of the first reflective sheet.

4. The display apparatus as claimed in claim 1, wherein the processor is further configured to:
turn on the edge type backlight in a first mode of the display mode in which content is displayed on and illuminated by the edge type backlight on an entirety of the display panel, and
turn on the top view type backlight in a second mode of the display mode in which content is displayed on and illuminated by the top view type backlight on only a portion of the display panel.

5. The display apparatus as claimed in claim 4, wherein the processor is further configured to determine the display mode as the first mode or the second mode based on an attribute of the content.

6. The display apparatus as claimed in claim 4, wherein the second mode is at least one of an easy user interface mode, a standby mode, and an ambient mode.

7. The display apparatus as claimed in claim 4, wherein the processor is further configured to display content only on an area of the display panel corresponding to the partial area of the first reflective sheet in the second mode.

8. The display apparatus as claimed in claim 4,
wherein the top view type backlight comprises:
a first top view type backlight disposed at a position corresponding to a first area of the display panel; and
a second top view type backlight disposed at a position corresponding to a second area of the display panel different from the first area of the display panel, and
wherein the processor is further configured to turn on at least one of the first top view type backlight and the second top view type backlight based on at least one of a number and an attribute of content provided in the second mode.

9. The display apparatus as claimed in claim 7, wherein the processor is further configured to move and display the content on a predetermined pixel basis in the area of the display panel corresponding to the partial area of the first reflective sheet.

10. The display apparatus as claimed in claim 4, wherein the content includes at least one of weather, clock, schedule, message, and call related information.

11. A method for controlling a display apparatus including a display panel, a first reflective sheet including a partial area having a first refractive index, a light guide plate disposed between the display panel and the first reflective sheet, and having a second refractive index less than the first refractive index, an edge type backlight including a plurality of light emitting diodes and disposed at an edge of the light guide plate, a top view type backlight including at least one light emitting diode and disposed at an opposite side of the first reflective sheet from the light guide plate at a position corresponding to the partial area of the first reflective sheet, the method comprising:
identifying, by a processor of the display apparatus, a display mode of the display apparatus as a first display mode where an entirety of the display panel of the display apparatus is illuminated by the edge type backlight of the display apparatus and a second display mode where only a portion of the display panel of the display apparatus is illuminated by the top view type backlight of the display apparatus; and
selectively turning on, by the processor of the display apparatus, one of the edge type backlight and the top view type backlight according to the identified display mode.

12. The method as claimed in claim 11, wherein when the top view type backlight is turned on:
light emitted from the top view type backlight and incident on the partial area of the first reflective sheet at an angle exceeding a predetermined angle range is totally reflected by the partial area of the first reflective sheet, and
light emitted from the top view type backlight and incident on the partial area of the first reflective sheet at an angle within the predetermined angle range is transmitted to the light guide plate through the partial area of the first reflective sheet.

13. The method as claimed in claim 12, wherein the display apparatus further comprises:
a second reflective sheet disposed at an opposite side of the at least one light emitting diode of the top view type backlight from the first reflective sheet; and
a prism sheet disposed on the second reflective sheet,
wherein light reflected by the partial area of the first reflective sheet is scattered by the prism sheet and reflected back toward the partial area of the first reflective sheet.

14. The method as claimed in claim 11, wherein the turning on further comprises:
turning on the edge type backlight in the first mode of the display mode in which content is displayed on and illuminated by the edge type backlight on an entirety of the display panel; and
turning on the top view type backlight in the second mode of the display mode in which content is displayed on and illuminated by the top view type backlight on only a portion of the display panel.

15. The method as claimed in claim 14, wherein the identifying further comprises:
identifying the display mode of the display apparatus based on an attribute of the content.

16. The method as claimed in claim 14, wherein the second mode is at least one of an easy user interface mode, a standby mode, and an ambient mode.

17. The method as claimed in claim 14, further comprising:
displaying content only on an area of the display panel corresponding to the partial area of the first reflective sheet in the second mode.

18. The method as claimed in claim 14,
wherein the top view type backlight comprises:
- a first top view type backlight disposed at a position corresponding to a first area of the display panel; and
- a second top view type backlight disposed at a position corresponding to a second area of the display panel different from the first area of the display panel, and wherein the turning on comprises turning on at least one of the first top view type backlight and the second top view type backlight based on at least one of a number and an attribute of content provided in the second mode.

19. The method as claimed in claim 17, further comprising:
- moving and displaying the content on a predetermined pixel basis in the area of the display panel corresponding to the partial area of the first reflective sheet.

20. The method as claimed in claim 14, wherein the content includes at least one of weather, clock, schedule, message, and call related information.

* * * * *